United States Patent [19]

Kieffer et al.

[11] Patent Number: 4,905,785
[45] Date of Patent: Mar. 6, 1990

[54] INTERMEDIATE GOVERNOR SYSTEM

[75] Inventors: Daniel R. Kieffer, Kirkland; Gary G. Ziebell, Renton, both of Wash.

[73] Assignee: Paccar Inc, Bellevue, Wash.

[21] Appl. No.: 138,506

[22] Filed: Dec. 24, 1987

[51] Int. Cl.⁴ .................. B60K 31/08; B60K 31/04; B60K 31/16

[52] U.S. Cl. .................. 180/177; 180/179; 180/173; 180/272; 123/352

[58] Field of Search .................. 180/170, 175–179, 180/173, 272; 123/352, 351, 350, 333, 198 D, 198 DB, 358, 359; 364/424.1, 426.04

[56] References Cited

U.S. PATENT DOCUMENTS

| | | | |
|---|---|---|---|
| Re. 21,776 | 4/1941 | Hoof | 180/175 X |
| 2,945,547 | 7/1960 | Bunker | 180/175 |
| 3,890,360 | 6/1975 | Pruvot et al. | 60/431 |
| 3,948,116 | 4/1976 | Van Pelt | 74/482 |
| 4,076,094 | 2/1978 | Moody et al. | 180/170 |
| 4,248,194 | 2/1981 | Drutchas et al. | 123/357 |
| 4,351,293 | 9/1982 | Hewitt | 123/198 DB |
| 4,416,230 | 11/1983 | Katayose et al. | 123/325 |
| 4,422,420 | 12/1983 | Cromas et al. | 123/352 |
| 4,439,833 | 3/1984 | Yamaguchi et al. | 364/431.09 |
| 4,445,329 | 5/1984 | Drisko | 60/431 |
| 4,448,094 | 5/1984 | Yarnell | 74/872 |
| 4,470,117 | 9/1984 | Miki et al. | 364/424.1 |
| 4,484,555 | 11/1984 | Miura | 123/407 |
| 4,515,040 | 5/1985 | Takeuchi et al. | 74/866 |
| 4,559,912 | 12/1985 | Larom et al. | 123/350 |
| 4,604,976 | 8/1986 | Sturdy | 123/352 |
| 4,675,818 | 6/1987 | Miyawaki et al. | 364/424.1 |

OTHER PUBLICATIONS

"ETEC Electronic Engine Control", Cummins Series, TRW Inc. 1082.
"The New 88 Series Solid State Electronic Road Speed Control & Engine Governor" The Cost Manager, Sturdy Controls Division.
"Vehicle Limiting by Hewitt", Hewitt Industries of Los Angeles.
Society of Automotive Engineers, Inc, "Truck Speed Controls Can Save Fuel" and Electronic Speed Control is Multi-functional, Nov. 1982 issue of Automotive Engineering.

Primary Examiner—Charles A. Marmor
Assistant Examiner—Tamara L. Finlay
Attorney, Agent, or Firm—Seed and Berry

[57] ABSTRACT

An intermediate governor system is provided that restricts fuel supply in response to road speed. The system is programmable by the owner to an intermediate road speed that the truck cannot exceed in lower gears and a top road speed that can be achieved in the highest gear. The road speed is sensed and compared to a threshold value in the intermediate governor system. When the road speed exceeds the threshold value, the fuel delivered to the engine is restricted by the intermediate governor in order to prevent the engine from exceeding a predetermined engine speed. As the truck driver shifts the gears upward higher road speeds are attained at the same engine speed, the highest gear permitting the highest road speed.

21 Claims, 6 Drawing Sheets

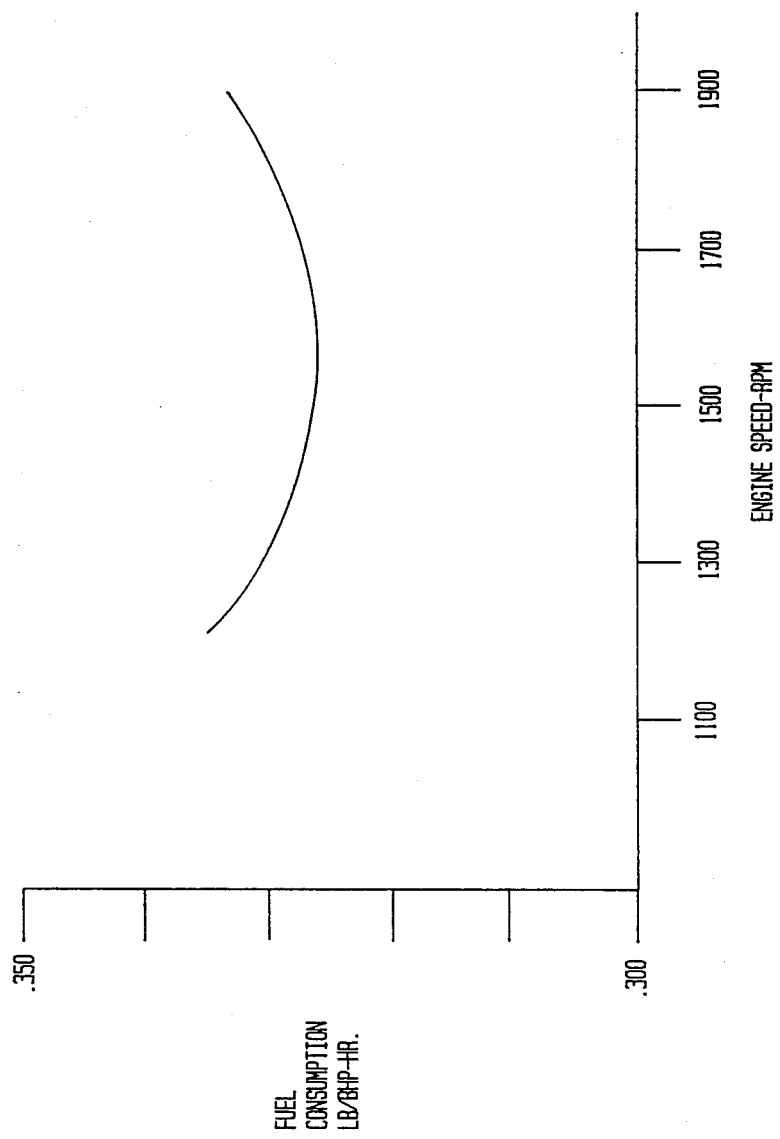

INTERMEDIATE GOVERNOR SYSTEM

TECHNICAL FIELD

This invention relates to governors for engines, and more particularly, to a governor which restricts the fuel flow to a first value when the road speed is within a predetermined range and to a lower value when the road speed is outside this range.

BACKGROUND ART

Operating a fleet of long-haul trucks in the most cost-efficient manner has been and remains a goal of many truck owners and companies. The owner of the trucks tries to keep costs at a minimum while providing good service and product delivery for the customers. Among the costs the owner tries to keep at a minimum are the costs of fuel, engine maintenance and replacement, etc.

When the driver is not the owner, he often does not pay for the fuel and therefore is not concerned with the cost of the fuel in driving the truck from one location to another on a long haul. The driver often drives at excessively high speeds, which not only uses excess fuel but also is dangerous. The owner would like governors on the truck to provide fuel-efficient and safe operation.

Many different methods and machines to achieve the goal of fuel-efficient and safe long-haul truck operation have been tried in the past.

Patents have issued which describe various types of governing systems for a large engine; for example, U.S. Pat. Nos. 4,515,040; 4,484,555; 4,448,094; 4,445,329; 4,439,833; 4,416,230; 4,351,293; 4,076,094; 3,948,116; 4,422,420; 4,248,194 and 3,890,360. These patents describe various systems for engines or transmissions in trucks. For example, U.S. Pat. No. 4,515,040 describes the use of a continuously variable transmission to bring the engine torque and the engine revolution speed to desired target values. U.S. Pat. No. 4,448,094 describes use of a governor that establishes a maximum rpm for the engine when air pressure is supplied to the governor and a lower maximum rpm for the engine when the supply of air to the governor is interrupted. The lower rpm range of the governor is engaged when the transmission of the vehicle is in a preselected gear. U.S. Pat. No. 4,416,230 describes a fuel cutout control circuit which terminates delivery of fuel to the engine when the throttle valve opens at an angle less than a predetermined value and the transmission is in high gear or in neutral. Pat. No. 4,351,293 describes a speed control system for a diesel-powered vehicle in which a sensing element responsive to the speed of the vehicle is connected through a control to close the fuel supply to the diesel engine to permit a preset limitation on vehicle speed. Similarly, U.S. Pat. Nos. 4,076,094 and 3,948,116 describe devices to limit the speed of the engine in response to vehicle speed, depending on the transmission gear of the vehicle. U.S. Pat. No. 4,422,420, to Cromas et al., describes a dual fuel flow path to provide fuel to the engine. An advertisement by TRW Inc., the assignee of the Cromas et al. patent, states that the system precisely controls the vehicle's road speed to established limits and a feature limits top engine speed in all gears. Similar advertisements by Hewitt Industries and Sturdy, Controls Division, describe features of engine control systems.

U.S. Pat. No. 3,948,116, to van Pelt, describes a governor to regulate the supply of fuel, with the supply of fuel being less when the top gear is selected. Column 1, lines 60–65, states that in the lower gears, the governor is ineffective so that the vehicle can be accelerated to a maximum. However, as soon as the top gear is engaged, the adjusting means are operated such that the maximum engine speed obtainable is lower than in the lower gears. Features similar to those discussed in the patent to van Pelt are also described in other patents, such as those to Katayose et al. and Yarnell, respectively U.S. Pat. Nos. 4,416,230 and 4,448,094.

DISCLOSURE OF THE INVENTION

It is an object of this invention to provide an intermediate governor system that limits engine speed to different values depending on the road speed and the transmission gear.

It is a further object of this invention to provide an intermediate governor that limits engine speed to a preset value when the road speed exceeds a threshold speed.

It is a further object of this invention to permit the intermediate governor to be activated at a road speed selected and programmed by the owner.

These and other objects are accomplished by providing an engine with two governor systems, one activated in response to engine speed (rpm) and the other to vehicle speed (mph). The first governor system is a maximum engine speed (rpm) governor that restricts the flow of fuel to the engine when the threshold maximum engine speed (rpm) is achieved. This governor system prevents the engine from exceeding the preset maximum engine speed (rpm) at all times. The maximum engine speed governor is activated in response to speed (rpm) of the engine. When the speed (rpm) of the engine exceeds the preset threshold limit, then the fuel supply to the engine is restricted to prevent the engine speed from being above the maximum value.

The second governor system is an intermediate governor system that, when activated, restricts the flow of fuel to prevent the engine from exceeding a second, lower threshold speed than that permitted by the maximum engine speed governor. The intermediate governor is activated in response to the road speed. That is, a sensor detects the road speed (mph) of the vehicle and transmits this to a comparison device that is part of the intermediate governor system. When the speed of the vehicle is above a threshold value, the comparison device sends a signal to activate the intermediate governor. The intermediate governor is also activated when the vehicle road speed is below some minimum value such as 3 mph.

If the vehicle slows down so that the road speed returns to less than the threshold value, plus a reset value, the intermediate governor is deactivated.

The intermediate governor system provides for owner selection and programming of an intermediate road speed and a maximum road speed. The system limits the road speed to an intermediate value in the lower gears and to higher values in the higher gears. The maximum road speed is attainable only in the highest gear.

The intermediate governor system can be programmed easily by the owner. A series of switches are provided to set the intermediate road speed upper threshold value. Depending on the switch settings, the intermediate governor will be activated at different road speeds. The maximum permitted engine speed when the intermediate governor is activated is settable by mechanical means. After the switches are selected by the owner, the box is placed in a sealed position. Additional safeguards are provided to make the system tamper-resistant.

BRIEF DESCRIPTION OF THE DRAWINGS

FIG. 3 is a graph showing the relationship between engine speed in revolutions per minute and fuel consumption under certain conditions.

BEST MODE FOR CARRYING OUT THE INVENTION

Figure 1:
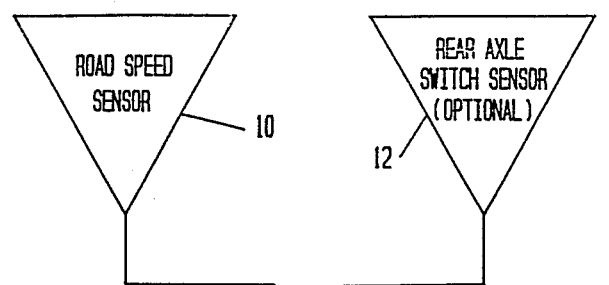
FIG. 1 is a block diagram showing the functional relationship of the different parts of the invention.

FIG. 1 illustrates the functional connection of various parts of the present invention.

The maximum rpm governor system includes an rpm sensor 18 which provides the engine rpm to the maximum rpm governor 20. When the rpm exceeds a threshold limit that has been selected by the customer, the maximum rpm governor 20 will limit the fuel delivered to the engine to prevent the engine speed from increasing. Maximum rpm governors and sensors are well known in the art and are usually built into the engine by the manufacturer.

A road speed sensor 10 provides the road speed to the programmable comparison circuit. The programmable comparison circuit 14 compares the road speed to the threshold road speed which has been programmed into the circuit. When the road speed equals or exceeds this threshold value, the circuit 14 sends a signal to activate the intermediate governor 16. When the intermediate governor is activated, fuel delivered by the fuel delivery system 22 is restricted to prevent the engine speed from exceeding a preset value. The intermediate governor includes an engine speed (rpm) governor that uses a fuel flow restrictor to prevent the engine from exceeding a preset speed (rpm). The fuel flow permitted to limit the engine speed to the preset value varies depending upon the load, whether the truck is travelling uphill or downhill, driving conditions, etc. Fuel flow restrictors that permit a variable flow rate while preventing the engine from exceeding a preset speed are well known in the art. In one embodiment of this invention, a fuel flow restrictor presently available on Cummins' engines is used.

The invention includes a fuel restriction means having a first fuel restriction means for preventing the engine from exceeding a first preset engine speed and a second fuel restriction means for preventing the engine from exceeding a second preset engine speed. The first fuel restriction means includes the maximum RPM governor system having an RPM sensor 18 and a maximum RPM governor 20 previously described. The second fuel restriction means includes an intermediate governor 16 and a solenoid valve 32, as shown in FIG. 2.

The road speed sensor is a magnetic pickup located near a rotating shaft in the transmission, as is known in the art, and provides the true road speed instantaneously at any given time. However, the road speed sensor could be any conventional sensor, such as a pickup through an odometer cable, etc.

In the event the truck has a dual speed rear axle, there is an input 12 from a rear axle switch sensor to indicate to the programmable comparison circuit the state of the rear axle switch.

Figure 2:
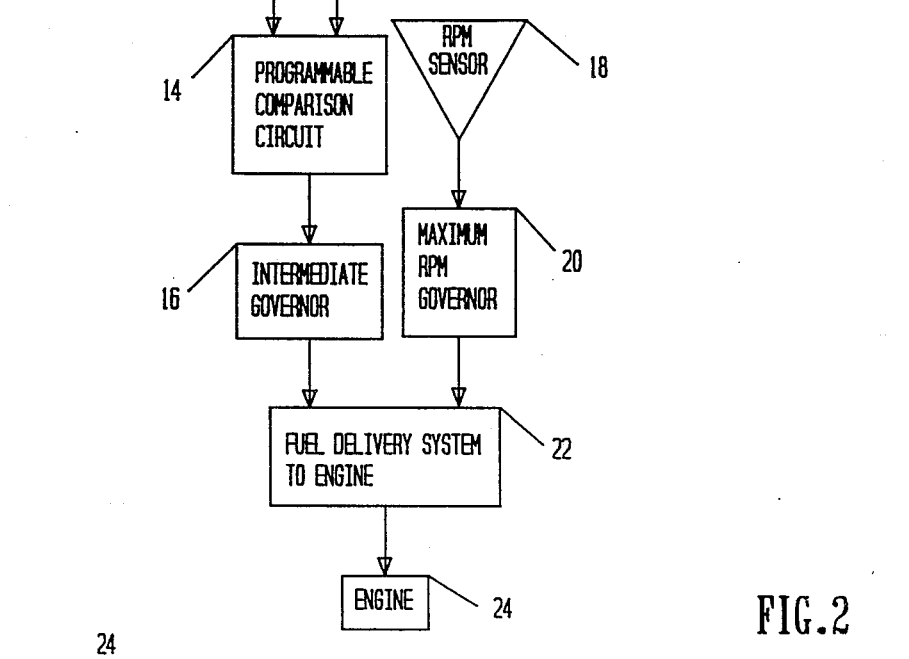
FIG. 2 is a diagram representing the relationship between the engine, the transmission and features of the invention.

FIG. 2 illustrates one embodiment of the physical arrangement for carrying out the invention. A transmission 26 is provided which is attached to the engine 24. An air supply 30 has an input into the fuel delivery system 22. When the air supply is "on," the intermediate governor is not activated. Fuel flow to the engine is directly controlled by the throttle, which is under the driver's control. When the air supply is shut off, the intermediate governor is activated and the fuel supply is restricted to limit the engine speed to a value previously set according to the values provided by the customer, as described herein.

A solenoid valve 32 is provided in the air supply line 28. When the solenoid valve 32 is open, the air supply is "on" and the intermediate governor is not activated. In this state, the maximum engine speed is limited by the maximum rpm governor 20. If the road speed exceeds the programmed intermediate value, a signal is sent from the programmable comparison circuit 14 to the solenoid valve 32 to close the solenoid valve and shut off the air to the intermediate governor system 16. When the air is shut off, the intermediate governor is activated and the fuel supply will be restricted to limit the engine speed, as described herein.

FIG. 3 is a graph of fuel consumption versus engine speed for a Cummins NTC BC4 engine at wide open throttle. The graph is for a Fuller transmission model RTO-14613; a rear axle ratio of 3.55; a tire size of 285/80R 24.5; a frontal area of 102 sq. ft.; running on flat ground at sea level; a vehicle weight of 80,000 lbs.; and a rolling resistance of 0.8%. Appropriate variations will occur for different vehicle weights, road conditions, etc.

The lowest fuel consumption is in the range of 1575 to 1600 rpm for this particular engine. More fuel is consumed at higher and lower speeds, 1900 and 1200, respectively. Engine speeds above 1900 rpm are not shown but consume more fuel than 1900 rpm. Fuel efficiency is increased when the engine is run at the lowest fuel consumption for extended periods of time.

TABLE I

| RPM | 1200 | 1300 | 1400 | 1500 | 1600 | 1700 | 1800 | 1900 | 2000 | 2100 |
|---|---|---|---|---|---|---|---|---|---|---|
| Gear Number 1 | Transmission Ratio 12.560 | | | | | | | | | |
| MPH | 3.2 | 3.5 | 3.8 | 4.0 | 4.3 | 4.6 | 4.8 | 5.1 | 5.4 | 5.6 |
| Gear Number 2 | Transmission Ratio 8.320 | | | | | | | | | |
| MPH | 4.9 | 5.3 | 5.7 | 6.1 | 6.5 | 6.9 | 7.3 | 7.7 | 8.1 | 8.5 |
| Gear Number 3 | Transmission Ratio 6.180 | | | | | | | | | |
| MPH | 6.6 | 7.1 | 7.6 | 8.2 | 8.7 | 9.3 | 9.8 | 10.4 | 10.9 | 11.5 |
| Gear Number 4 | Transmission Ratio 4.540 | | | | | | | | | |
| MPH | 8.9 | 9.7 | 10.4 | 11.1 | 11.9 | 12.6 | 13.4 | 14.1 | 14.9 | 15.6 |
| Gear Number 5 | Transmission Ratio 3.380 | | | | | | | | | |
| MPH | 12.0 | 13.0 | 14.0 | 15.0 | 16.0 | 17.0 | 18.0 | 19.0 | 20.0 | 21.0 |

TABLE I-continued

| RPM | 1200 | 1300 | 1400 | 1500 | 1600 | 1700 | 1800 | 1900 | 2000 | 2100 |
|---|---|---|---|---|---|---|---|---|---|---|
| Gear Number 6 | Transmission Ratio 2.460 | | | | | | | | | |
| MPH | 16.5 | 17.8 | 19.2 | 20.6 | 21.9 | 23.3 | 24.7 | 26.1 | 27.4 | 28.8 |
| Gear Number 7 | Transmission Ratio 2.150 | | | | | | | | | |
| MPH | 18.8 | 20.4 | 22.0 | 23.5 | 25.1 | 26.7 | 28.2 | 29.8 | 31.4 | 33.0 |
| Gear Number 8 | Transmission Ratio 1.830 | | | | | | | | | |
| MPH | 22.1 | 24.0 | 25.8 | 27.7 | 29.5 | 31.3 | 33.2 | 35.0 | 36.9 | 38.7 |
| Gear Number 9 | Transmission Ratio 1.600 | | | | | | | | | |
| MPH | 25.3 | 27.4 | 29.5 | 31.6 | 33.7 | 35.8 | 38.0 | 40.1 | 42.2 | 44.3 |
| Gear Number 10 | Transmission Ratio 1.340 | | | | | | | | | |
| MPH | 30.2 | 32.7 | 35.2 | 37.8 | 40.3 | 42.8 | 45.3 | 47.8 | 50.4 | 52.9 |
| Gear Number 11 | Transmission Ratio 1.170 | | | | | | | | | |
| MPH | 34.6 | 37.5 | 40.4 | 43.3 | 46.1 | 49.0 | 51.9 | 54.8 | 57.7 | 60.6 |
| Gear Number 12 | Transmission Ratio 1.000 | | | | | | | | | |
| MPH | 40.5 | 43.9 | 47.2 | 50.6 | 54.0 | 57.4 | 60.7 | 64.1 | 67.5 | 70.8 |
| Gear Number 13 | Transmission Ratio 0.870 | | | | | | | | | |
| MPH | 46.5 | 50.4 | 54.3 | 58.2 | 62.0 | 65.9 | 69.8 | 73.7 | 77.6 | 81.4 |

Table I shows the relationship between revolutions per minute, transmission gears, and miles per hour obtainable. Table I is for a Cummins NTC BC4 engine; Fuller transmission model RTO-14613, with a rear axle ratio of 3.55 and a tire size of 285/80R 24.5, which corresponds to 501 revolutions per mile. Variations in the tire size, rear axle, transmissions, etc., would, of course, vary the miles per hour obtainable at particular engine revolutions per minute. Table I and FIGS. 3-4 are given as examples for illustration, and those skilled in the art could obtain similar data for any engine and apply the invention to it.

Figure 4A:
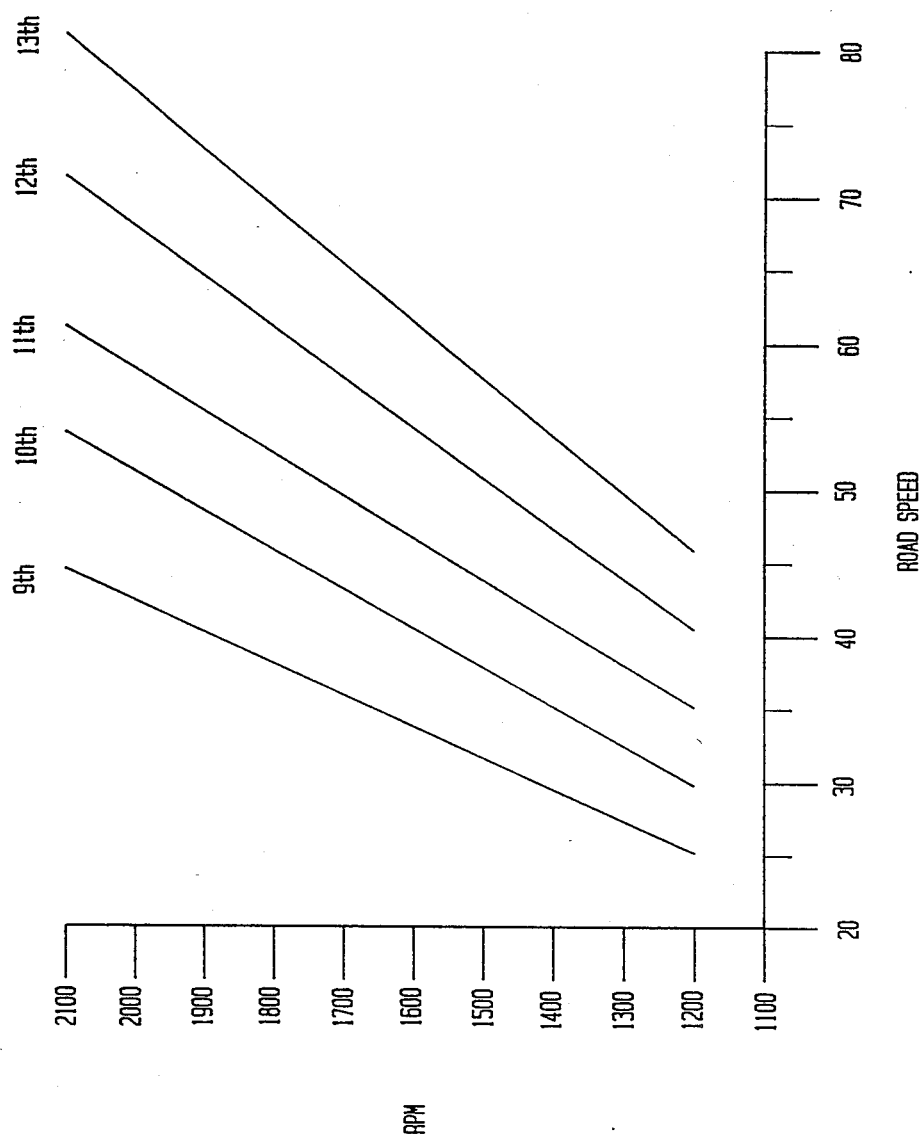
FIGS. 4A-4B are graphs illustrating operation of an engine without the invention and with the invention.
Figure 4B:
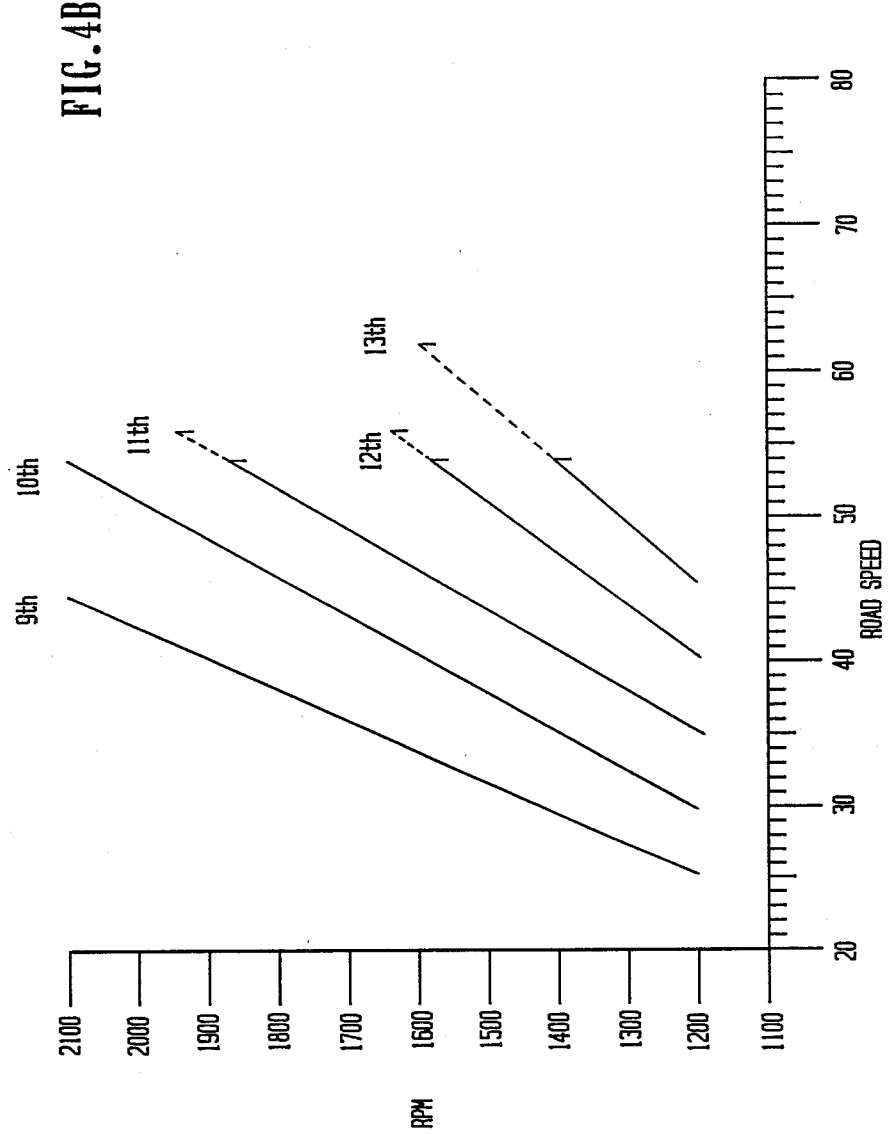

FIGS. 4A and 4B are graphs illustrating engine revolutions per minute versus road speed. FIG. 4A is taken directly from Table I and illustrates operating characteristics without use of the present invention. As can be seen viewing Table I, in gear number 1, at an engine speed of 2100 rpm, a road speed of 5.6 mph is the maximum possible. In gear number 10, at 2100 rpm, a speed of 52.9 miles per hour is attainable. In gear number 11, speeds up to 60.6 mph can be obtained; in gear number 12, speeds above 70 mph can be attained when the engine rpm is 2100; and in gear 13, speeds above 80 mph can be attained. In gear number 13, at 1600 rpm, the road speed is 62 mph. Also, 1600 rpm is at or very near the most fuel-efficient running point for the engine speed for the parameters specified with respect to FIG. 3.

The customer selects a top permitted road speed and an intermediate road speed. A maximum engine speed rpm value limits the engine speed in all gears at all times, as described herein with respect to the maximum rpm governor system. The selected top road speed and intermediate road speed are used to program the intermediate governor system. The top road speed is converted into engine speed for the highest gear using Table I and the intermediate governor is set by a mechanical means to limit the engine speed to this value whenever it is activated. The intermediate road speed is the road speed at which the intermediate governor is activated. The top road speed is the highest road speed the engine can achieve with the intermediate governor activated. The top road speed will always be achieved in top gear. When the road speed falls below the intermediate road speed, plus a reset factor, the intermediate governor is deactivated and the driver will have full control of the fuel flow through the throttle once again.

The operation of the invention can be seen by the following example, as shown in FIG. 4B. The owner selects an intermediate road speed, for example, 56 mph, with a top road speed of 62 mph. A reset factor of 2 mph less than the intermediate road speed is designed into the system. Viewing Table I and FIG. 4B, it can be seen that to achieve 62 mph, the engine speed must be 1600 rpm. The intermediate governor fuel flow restrictor is set to permit enough fuel to flow to permit an engine speed of 1600 rpm, but not higher. The comparison circuit is programmed to activate the intermediate governor when the road speed equals 56 mph. The maximum rpm governor is previously set at 2100 by the engine manufacturer.

As the driver begins to operate the truck, he will start in first gear; and at or before reaching 2100 rpm, he will shift into second gear to pick up additional speed. The driver will continue to shift upward and will achieve higher speeds in each gear, as shown in Table I and FIG. 4B.

As the truck moves, the road speed sensor is constantly updating the road speed and providing the current road speed to the programmable comparison circuit. The programmable comparison circuit is comparing the road speed with the programmed threshold value of 56 mph. In gear 11, when the engine rpm is between 1900 and 2000 rpm, the truck road speed will equal 56 mph, the intermediate road speed. The comparison device then sends a signal to activate the intermediate governor.

When the intermediate governor is activated, the fuel flow delivery system restricts the fluid flow to keep the engine from exceeding 1600 rpm. The engine is presently above 1900 rpm, so, due to the fuel flow restriction, the engine speed decreases and begins to approach a speed of 1600 rpm and the truck's road speed decreases. When the truck's road speed has slowed to 54 mph, a reset factor of 2 mph being used, the programmable comparison circuit, which continues to receive input from the road speed sensor, sends a signal to deactivate the intermediate governor. At this point, the engine speed is between 1800 and 1900 rpm. With the intermediate governor deactivated, the fuel flow restriction is removed and full fuel flow control is returned to the driver. The driver may then increase the speed to 55 or 55.5 mph and stay in this range if desired at an engine speed of between 1900 and 2000 rpm. However, if the vehicle road speed equals 56 mph, the fuel flow will be restricted until the vehicle speed decreases by the reset factor. Above 1900 rpm, the engine is comparatively inefficient and uses excessive fuel, as can be seen from FIG. 3. The driver is required to shift to a higher gear to achieve a higher speed.

Once the driver shifts into gear 12, he can achieve 56 mph between 1600 and 1700 rpm, a more fuel-efficient engine speed than the same road speed in gear 11, as can be seen from FIG. 3. The programmable comparison circuit continues to receive inputs from the road speed sensor at all times and, if the road speed equals or exceeds the intermediate road speed of 56 mph, sends a signal to activate the intermediate governor to limit fuel delivery in order to permit an engine speed of 1600 rpm. If the driver wants extra speed, he must shift into gear 13.

Once the truck is in gear 13, a road speed of 56 mph is achieved at an engine speed of about 1450 rpm, as can be seen from Table I. The programmable comparison circuit sends a signal activating the intermediate governor because the road speed exceeds 56 mph. The fuel supply restrictor is set to prevent engine speeds in excess of 1600 rpm; and because the engine is running at 1450 rpm, there is no flow restriction on the fuel delivery. The driver retains complete fuel control through the throttle and can increase the road speed up to an engine speed of 1600 rpm. At an engine speed of 1600 rpm, a road speed of 62 mph is achieved. The fuel delivery system restricts the fuel supply at a preset flow rate so that an engine rpm of 1600 cannot be exceeded. The truck driver can continue to operate the truck at 62 mph as long as desired with no further fuel restrictions or slowing down due to governors. At 62 mph, the truck operates at about its maximum fuel efficiency point of 1600 rpm according to the parameters at FIG. 3. The driver has been encouraged to shift upward to achieve the high speeds.

The intermediate governor is activated in all gears to limit the engine speed to 1600 rpm if the road speed equals or exceeds the programmed road speed, in this example, 56 mph. In the event the driver shifts back into gear 12 at 62 mph (an engine speed of about 1840 rpm) the fuel supply will be restricted to prevent an engine speed in excess of 1600 rpm and the truck speed will begin to decrease.

The previous example can easily be applied to any road speed setting selected by the customer. For example, the customer may choose an intermediate road speed of 52 mph and a maximum speed of 70 mph and program the comparison circuit accordingly. The intermediate governor, when activated, restricts fuel flow so as to permit an engine speed corresponding to 70 mph in highest gear, about 1800 rpm, but not higher. When the truck is in gear 10, the road speed exceeds 52 mph at 2100 rpm with a reset factor of 2 mph, the truck will begin to slow down toward 50 mph. As the truck slows down, the driver shifts into gear 11 and reaches 52 mph at just above 1900 rpm. The intermediate governor restricts fuel flow to prevent engine rpm above 1800, so the road speed will decrease. When the driver shifts into gear 12, the intermediate governor is again activated at 52 mph, which is 1550 rpm. The intermediate governor, when activated, is effective to prevent engine speed in excess of 1800, so even with the intermediate governor activated, the road speed could rise until engine speed equals about 1800 rpm, which for gear 12 corresponds to a road speed of 60.7 mph.

The driver can operate at 60.7 mph or lower in gear 12 as long as desired. However, he may wish to achieve higher speeds, so he shifts into gear 13. The speed of the vehicle at about 1800 rpm in gear 13 is about 70 mph, the maximum road speed selected. This is a much faster speed than permitted in gear 12 and is also more fuel efficient than operating at 70 mph in gear 12. The owner is able to limit the operating range of the truck to its more fuel-efficient and safe engine speeds while encouraging the driver to achieve higher speeds by shifting upward. This greatly encourages the fuel-efficient operation of the truck.

The fuel consumption versus engine speed curves are different for each engine and the owner has available such a curve for each engine. The owner can select those values that provide maximum fuel efficency in top gear for each engine while encouraging the driver to use the most fuel-efficient engine speed for each gear. This particular invention encourages the driver to shift the truck into higher gears in order to obtain higher speeds, and thus encourages the concept of "gear fast, run slow."

The programmable comparison circuit is also provided with a programmed minimum road speed below which the intermediate governor is activated. The minimum road speed most likely to be used is 3 mph; however, the comparison circuit can be programmed to be activated at other minimum speeds, such as less than 1 mph to speeds less than 5 mph, etc. The programmable comparison circuit constantly receives input from the road speed sensor, which provides the exact road speed at all times. When the road speed sensor indicates that the road speed is less than 3 mph, assuming that is the value which has been selected, then the comparison circuit sends a signal activating the intermediate governor. The intermediate governor limits the delivery of the fuel to the same value which was preselected as the fuel flow to be delivered in order to achieve the maximum road speed. In the example given, the maximum road speed selected was 62 mph in gear 13, which corresponds to 1600 rpm and the fuel flow as shown in FIG. 3. When the road speed is less than 3 mph, the intermediate governor is activated and the engine speed will not exceed 1600 rpm. This particular feature of the invention is extremely useful when the driver is warming up the engine, or revving in neutral while not moving, or as a tamper-resistant measure.

A reset value of 2 mph has been used, but a different value could be programmed into the system, if desired. The minimum speed and reset values are programmed into the circuit with PROMs or other semiconductor memory, but could be programmed by owner controlled switches, if desired.

Figure 5A:
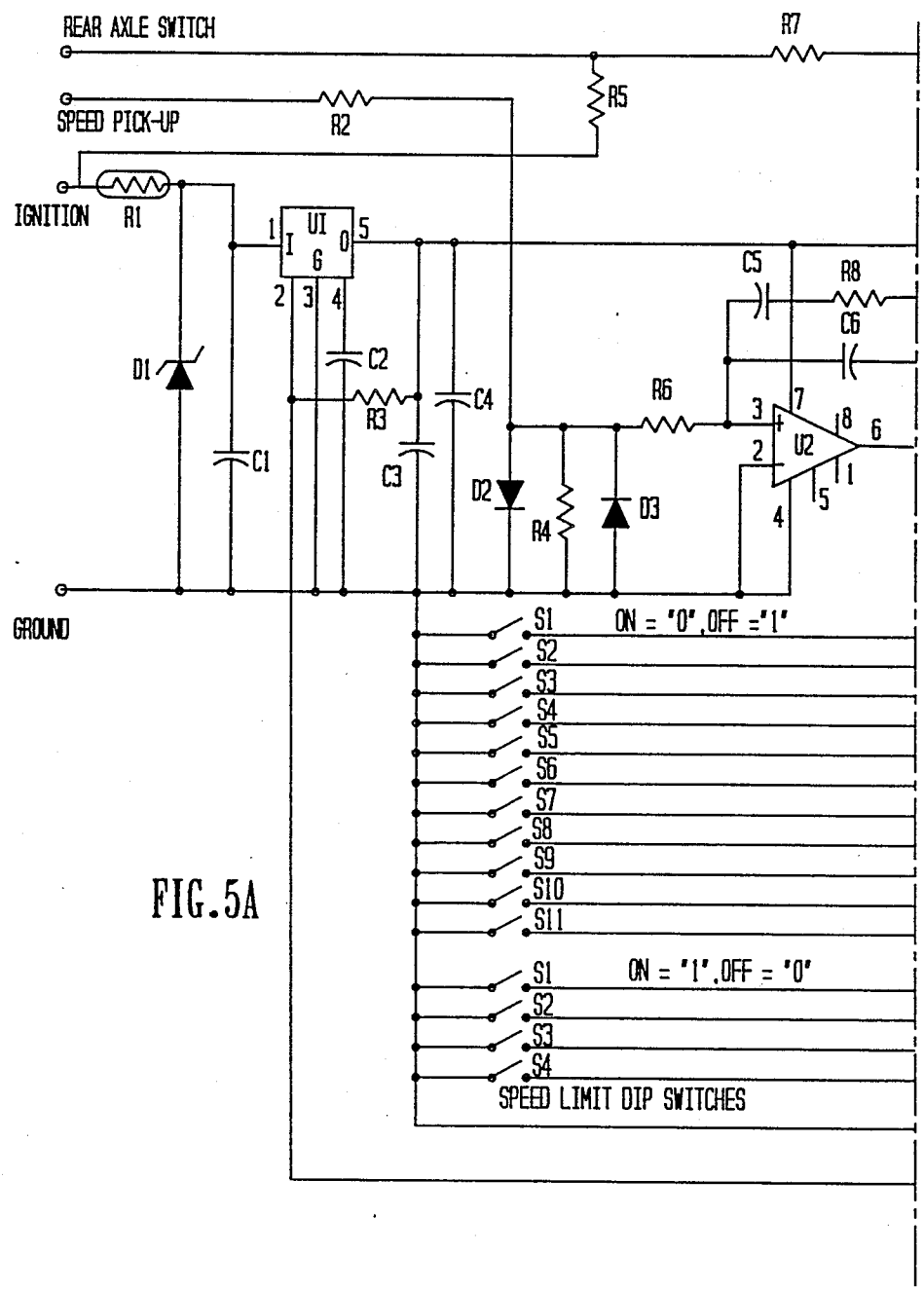
FIGS. 5A and 5B are the circuit diagram of the programmable comparison device.
Figure 5B:
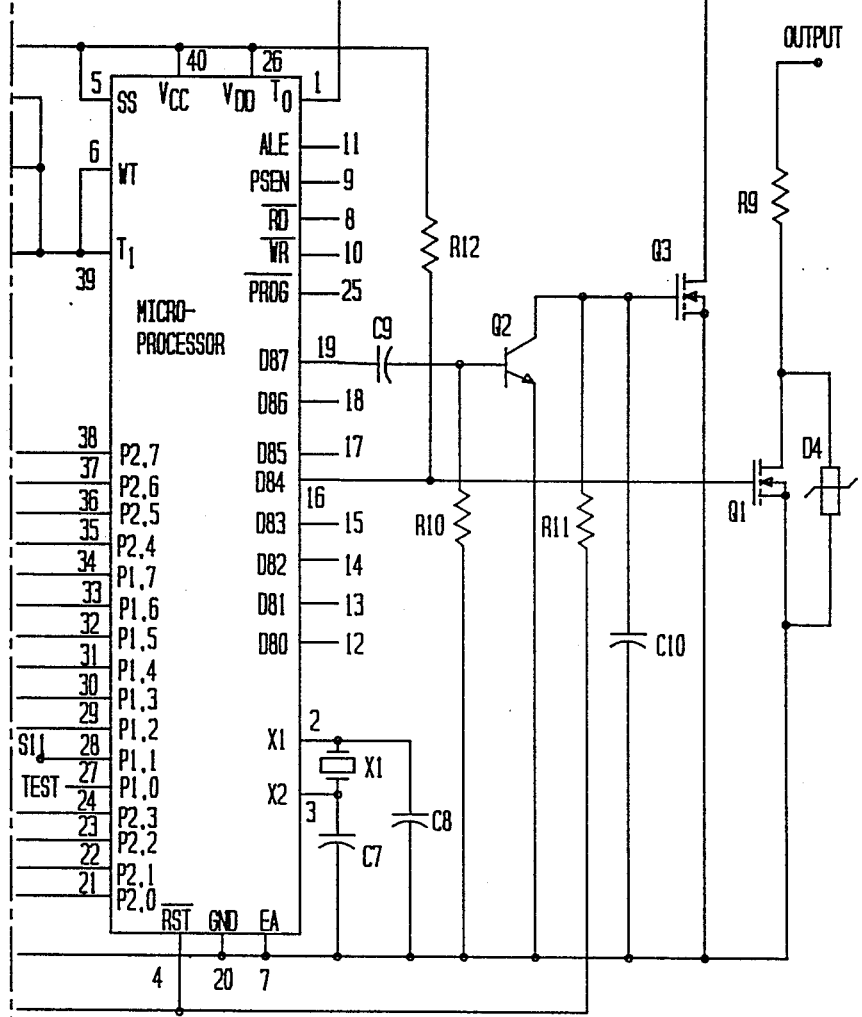

FIGS. 5A and 5B show the internal circuit within the programmable comparison device. All of the outputs and inputs comply with the applicable specifications in the industry. For example, the speed pickup switch complies with the specifications in the industry for electronic speedometers. The comparison circuit inputs may be used in parallel with an electronic speedometer without affecting it. The output, which is current-sinking (switch-to-ground), will drive an inductive load of 50 ohms or more in series with 250 milliHenries or less. The calibration of the comparison circuit is made by use of an eleven-position dip switch, shown as S1–S11, providing inputs to the microprocessor. The calibration can include factors such as tire size, rear axle ratio, etc., and is identical to that presently used for some electronic speedometers and is well known in the industry. The intermediate speed is set with the four-position dip switch. The different combinations of the dip switch settings permit the customer to select an intermediate road speed. One microprocessor which has been used is the NEC PD80C48C. This particular microprocessor, as well as others, is known in the industry for use in these types of applications, electronic speedometers, etc. An output from the microprocessor is provided as the output of the programmable comparable circuit 14, as shown in FIGS. 1, 2 and 5B. When the vehicle speed is less than the intermediate road speed, then the output is connected to ground, which provides the signal to maintain the solenoid in the open position. When the vehicle speed is greater than or equal to the intermediate vehicle speed selected for approximately two seconds or when the vehicle speed is less than the threshold value, for example, 3 mph, the output is floated, that is, held open. Once the intermediate governor has been activated, the vehicle speed must be less than the intermediate speed by a penalty factor in order for the output wire to be switched to ground and deactivate the intermediate governor. A penalty factor of 2 mph has been used, but other values are possible.

The arrangement of the invention forms an advantageous, tamper-resistant system. The solenoid valve 32 is of the type that if the signal from the data comparison circuit is cut off, then the solenoid valve will close, shutting off the supply of air which activates the intermediate governor. In normal operation, the programmable comparison circuit 14 provides a signal to the solenoid valve to maintain it in the open position. In the event the driver tampers with the system and tries to remove the effect of the intermediate governor, he may do so by cutting the wires going from the comparison circuit 14 to the solenoid valve. However, if the wires to the solenoid valve are cut, it does not receive the proper signal and the solenoid valve closes. The air supply is shut off, which activates the intermediate governor. Removal of the programmable comparison circuit or cutting of the wires causes the intermediate governor to be activated and does not serve to remove the control of the engine from the intermediate governor.

Similarly, the air supply line must provide air going into the intermediate governor in order for it to be deactivated. In the event the air supply is cut off, the intermediate governor is activated. A driver, in attempting to disconnect the intermediate road speed governor system, may disconnect the air supply going into the system. However, if the air supply line is broken or removed, the intermediate governor is activated.

The comparison circuit is in a sealed "black box" located in a remote position, with the switches concealed. The driver should not know the function of the "black box" nor the correct programming sequence for the switches. The owner of the vehicle is provided with a description of the circuit and programming instructions. The owner may access the box and program it as desired. Further, the intermediate governor 16 is integral with the fuel delivery system and is not accessible for removal or modification by the driver. In this manner, the entire system is made tamper-proof.

We claim:

1. A vehicle governor system comprising:
   a vehicle having an engine;
   a sensor to sense a road speed of said vehicle;
   fuel restriction means for restricting a fuel flow to said engine to prevent said engine from exceeding a first preset engine speed at all road speeds and to prevent said engine from exceeding a second present engine speed when said road speed exceeds a threshold value, said second engine speed being significantly less than said first engine speed; and
   a transmission coupled to said engine, said transmission being in a first gear when said road speed exceeds said threshold value and said transmission having a second gear, higher than said first gear, into which said transmission is shiftable for increasing said road speed above said threshold value.

2. The system of claim 1 wherein said fuel restriction means includes a first fuel restriction means for preventing said engine from exceeding said first preset engine speed and a second fuel restriction means for preventing said engine from exceeding said second preset engine speed.

3. The system of claim 2, further including a comparison circuit means for comparing said road speed to said threshold road speed and sending a signal for controlling said second fuel restriction means, said signal being indicative of whether said road speed is above or below said threshold value.

4. The system of claim 3 wherein said second fuel restriction means continues to prevent said engine speed from exceeding said second preset value after the road speed has exceeded said threshold value until said road speed is less than said threshold value by a reset value.

5. The vehicle governor of claim 3 wherein said comparison circuit includes programmable, external switches accessible to a user permitting said user to change said threshold value.

6. The vehicle governor of claim 3, further including an air supply means for providing air to prevent said fuel flow from being restricted and a solenoid to cut off said air supply in response to a signal from the comparison circuit means to permit restriction of said fuel flow.

7. The vehicle governor of claim 3 wherein said comparison circuit means provides a first signal to prevent said fuel flow from being restricted and a second signal to permit restriction of the fuel flow.

8. The vehicle governor of claim 7 wherein said comparison circuit means is connected to said fuel restriction means by a connection including electrical wires and said second signal is the same as that which would be provided if said electrical wires were disconnected from said fuel restriction means.

9. The vehicle governor system of claim 1, further including means to limit said engine speed to said second preset value when said road speed is less than a minimum preset value.

10. A vehicle governor system comprising:
    a vehicle having an engine;
    a sensor to sense a road speed of said vehicle;
    fuel restriction means for restricting a fuel flow to said engine to prevent said engine speed from exceeding a first preset engine speed at all road speeds and to prevent said engine speed from exceeding a second preset engine speed when said road speed exceeds a threshold value, said second engine speed being significantly less than said first engine speed;
    a comparison circuit means for comparing said road speed to said threshold road speed and sending a signal for controlling said second fuel restriction means, said signal being indicative of whether said road speed is above or below said threshold value; and
    an air supply for providing air to prevent said fuel flow from being restricted and a solenoid to cut off that air supply in response to a signal from said comparison circuit to permit restriction of said fuel flow.

11. A vehicle governor system comprising:
a vehicle having an engine;
a sensor to sense a road speed of said vehicle;
fuel restriction means for restricting a fuel flow to said engine to prevent said engine from exceeding a first preset engine speed at all road speeds and to prevent said engine from exceeding a second preset engine speed when said road speed exceeds a threshold value, said second engine speed being significantly less than said first engine speed; and
a comparison circuit means for comparing said road speed to said threshold road speed and sending a signal for controlling said second fuel restriction means, said signal being indicative of whether said road speed is above or below said threshold value, said comparison circuit providing a first signal to prevent said fluid flow from being restricted and a second signal to permit restriction of said fuel flow to prevent said engine speed from exceeding said second preset engine speed, said comparison circuit being connected to said fuel restriction means by a connection including electrical wires and said second signal being the same signal which would be provided if said electrical wires were disconnected from said fuel flow restriction means.

12. A method comprising:
sensing engine speed of an engine;
sensing road speed of a vehicle;
restriction a fuel flow to said engine to prevent said engine speed from exceeding a first present value;
restricting said fuel flow to said engine to prevent said engine speed from exceeding a second preset value lower than said first preset value when said road speed exceeds a road speed threshold value; and
permitting said road speed to exceed said road speed threshold value when a transmission coupling said engine to a drive train of said vehicle is shifted to a higher gear than the gear in which said road speed threshold value is attainable by said vehicle.

13. The method according to claim 12, wherein said step of restricting said fuel flow to the engine to the second value includes interrupting an air supply to an intermediate governor system.

14. The method according to claim 12 wherein said road speed threshold value is programmable by external switches.

15. The method according to claim 12 wherein after said road speed exceeds said threshold value said engine speed is prevented from exceeding said second preset value until said road speed is less than said threshold value by a reset value.

16. A method comprising:
sensing engine speed of an engine;
sensing road speed of a vehicle;
restricting a fuel flow to said engine to prevent said engine speed from exceeding a first preset value;
restricting said fuel flow to said engine to prevent said engine speed from exceeding a second preset value lower than said first preset value when said road speed exceeds a road speed threshold value; and
restricting said fuel flow to said second preset value when said road speed is less than a road speed minimum value that is less than said road speed threshold value.

17. A method of governing an engine to encourage operation of the engine in the most fuel-efficient operating speed range, comprising:
sensing engine speed of an engine in a vehicle, said engine being coupled to a drive train of said vehicle through a transmission having a plurality of gears;
preventing said engine speed from exceeding a first preset value by limiting the fuel supplied to said engine if said engine exceeds said first preset value;
sensing road speed of said vehicle;
preventing said engine speed from exceeding a second, lower preset value by limiting the fuel supplied to said engine if said road speed exceeds a threshold value, said second preset value being approximately at said engine's most fuel-efficient operating speed;
shifting said transmission to a higher gear while preventing said engine speed from exceeding said second preset value to permit said vehicle to achieve a higher road speed above said threshold value road speed; and
requiring said transmission to be shifted to a higher gear above the gear in which said threshold road speed is attained in order for the vehicle to attain a higher road speed.

18. The method according to claim 17 wherein said threshold value road speed is less than a desired maximum road speed of said vehicle when the transmission is in the highest gear.

19. The method according to claim 17, further including the step of shifting said transmission into a next higher gear, at least two gears higher than the gear in which said threshold road speed is attained while preventing said engine speed from exceeding said second preset value to permit a still higher road speed.

20. The method according to claim 17 wherein said threshold road speed is selectable by a programmer to require a user to shift upward to higher gears in order to attain higher speeds when the engine is operating at a selected fuel-efficient speed.

21. A vehicle governor system comprising:
a vehicle having an engine;
a sensor to sense a road speed of said vehicle;
fuel restriction means for restricting a fuel flow to said engine to prevent said engine speed from exceeding a first preset engine speed at all road speeds and to prevent said engine speed from exceeding a second preset engine speed when said road speed exceeds a threshold value, said second engine speed being significantly less than said first engine speed; and
a comparison circuit means for comparing said road speed to said threshold road speed and sending a signal for controlling said fuel restriction means, said signal being indicative of whether said road speed is above or below said threshold value, said comparison circuit means including programmable, external switches accessible to a user for permitting said user to change said threshold value.

* * * * *

UNITED STATES PATENT AND TRADEMARK OFFICE
CERTIFICATE OF CORRECTION

PATENT NO. : 4,905,785

DATED : March 6, 1990

INVENTOR(S) : Daniel R. Kieffer et al.

It is certified that error appears in the above-identified patent and that said Letters Patent is hereby corrected as shown below:

In claim 12, column 11, line 30, delete "restriction" and substitute therefor --restricting--.

Signed and Sealed this

Twenty-first Day of May, 1991

Attest:

HARRY F. MANBECK, JR.

Attesting Officer    Commissioner of Patents and Trademarks